United States Patent
Rebentisch

[11] 3,888,440
[45] June 10, 1975

[54] SUPPORT ARRANGEMENT
[75] Inventor: Hugo E. Rebentisch, Garden City, Mich.
[73] Assignee: Unistrut Corporation, Wayne, Mich.
[22] Filed: Apr. 8, 1974
[21] Appl. No.: 458,885

[52] U.S. Cl. ............................................... 248/73
[51] Int. Cl. ........................................... A47g 29/02
[58] Field of Search ......... 248/73, 220.5, 223, 224, 248/225; 211/176, 177

[56] References Cited
UNITED STATES PATENTS
| | | | |
|---|---|---|---|
| 3,055,462 | 9/1962 | Steele | 248/224 UX |
| 3,601,432 | 8/1971 | Fenwick | 248/243 |

FOREIGN PATENTS OR APPLICATIONS
| | | | |
|---|---|---|---|
| 446,644 | 3/1968 | Switzerland | 211/176 |
| 1,125,861 | 9/1968 | United Kingdom | 248/220.5 |

Primary Examiner—William H. Schultz
Attorney, Agent, or Firm—Peter Xiarhos; Elmer J. Nealon; Norman J. O'Malley

[57] ABSTRACT

A support arrangement for supporting loads such as electrical cable. The support arrangement includes a tubular structural member having a plurality of rectangular-shaped openings therein, a support arm for supporting a load and a locking clip. The support arm includes a T-shaped end portion which extends into one of the openings in the tubular member. The locking clip is then inserted into the opening, adjacent to the T-shaped end portion of the support arm, to securely lock the support arm to the tubular member.

11 Claims, 9 Drawing Figures

PATENTED JUN 10 1975 3,888,440

SHEET 1

SUPPORT ARRANGEMENT

BACKGROUND OF THE INVENTION

The present invention relates to a support arrangement and, more particularly, to a support arrangement for supporting a load such as electrical cable in applications such as cable vault and manhole installations.

In cable vault and manhole installations in the telephone utility field it is often required that a support frame be erected for supporting large numbers of electrical cables as commonly employed for the communication of telephone messages. Desirably, the support frame should be of sturdy construction and be capable of supporting a substantial weight of electrical cable. In addition, the support frame should be capable of being easily set up and, if later required, easily dismantled. At the present time, support frames for cable vault and manhole installations are most commonly constructed from a number of metal channel sections containing a plurality of T-shaped openings therein. These channel sections are arranged in an upright fashion and support arms having T-shaped end portions, commonly referred to as "cable hooks", are inserted via the T-shaped end portions into the T-shaped openings in the channel sections. Electrical cables are then strung from cable hook to cable hook and securely attached thereto. Support frames constructed in the abovedescribed manner have proven to be generally satisfactory and acceptable. However, the cable hooks of these support frames are capable of being easily upset, for example, by an installer or by natural vibratory forces or tremors (e.g., in an earthquake zone) with the result that the cable hooks are able to move up and out of the associated T-shaped openings in the channel sections. It therefore becomes necessary in these situations to expand additional effort to replace the cable hooks in their openings. In addition, the very configuration of the T-shaped openings in the channel sections imposes limitations on the amount of weight of cable that may be placed on the cable hooks without distorting the metal of the channel sections in the vicinity of the openings.

BRIEF SUMMARY OF THE INVENTION

In accordance with the present invention, a support arrangement is provided having general utility but which is particularly suitable for use in constructing support frames for cable vault and manhole installations. The support arrangement generally comprises a structural member, a support member and a locking clip. The structural member includes a side having a rectangular opening therein defined by top, bottom and side edge surfaces in the side. The side further has a front surface and rear surface and the rectangular opening in the side has a predetermined height and width. The support member has a T-shaped end portion disposed in the rectangular opening in the side and a support portion adjoining the T-shaped end portion. The T-shaped end portion has a bottom surface abutting the bottom edge surface in the side of the structural member, front edges abutting the inner surface of the side of the structural member adjacent to the rectangular opening, a top surface, and a rear edge. The T-shaped end portion further has a maximum width less than either diagonal of the rectangular opening but greater than the width of the rectangular opening, and has a minimum width slightly less than the width of the rectangular opening whereby the T-shaped end portion is incapable of any significant lateral movement within the opening.

The locking clip is disposed in the rectangular opening and adjacent to the top surface of the T-shaped end portion of the support member. The locking clip has a main body portion; a leg portion adjoining the main body portion and having an upper surface and a free, notched end; and side portions adjoining the main body portion. The main body portion of the locking clip is disposed adjacent to the rectangular opening above the top surface of the T-shaped end portion of the support member and external to the outer surface of the side of the structural member. The leg portion of the locking clip extends into the opening with the free, notched end thereof engaging the rear edge of the T-shaped end portion and the top surface thereof abutting the top edge surface of the side at a predetermined region, thereby preventing any significant upward movement of the support member within the rectangular opening. The side portions of the locking clip abut the outer surface of the side of the structural member.

BRIEF DESCRIPTION OF THE DRAWING

Various objects, features and advantages of a support arrangement in accordance with the present invention will be apparent from the following detailed discussion taken in conjuction with the accompanying drawing in which.

DETAILED DESCRIPTION OF THE INVENTION

Figure 1:
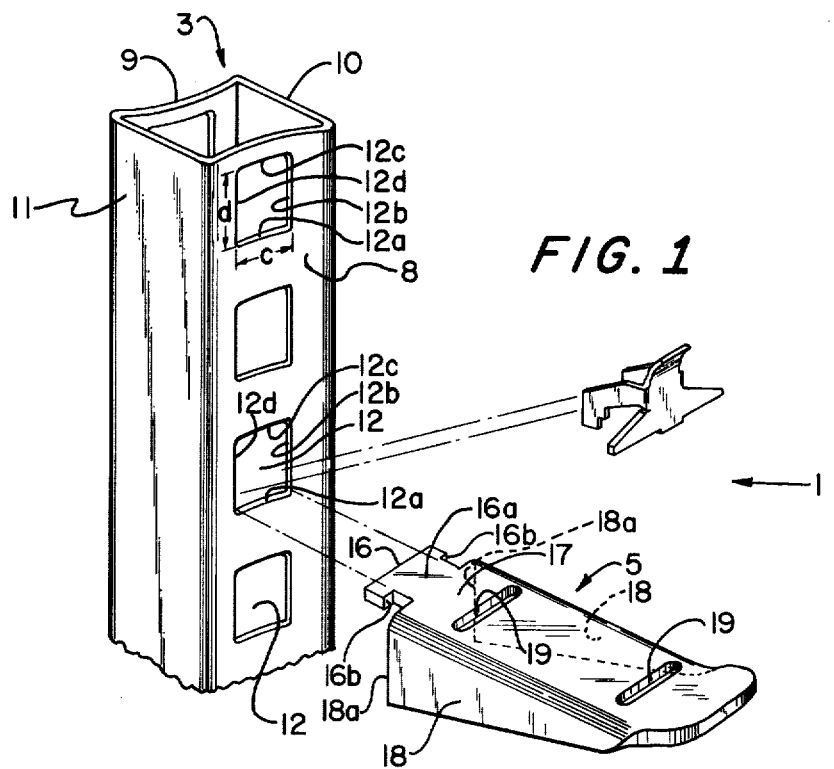
FIG. 1 is an exploded perspective view of a support arrangement in accordance with the present invention.
Figure 2:
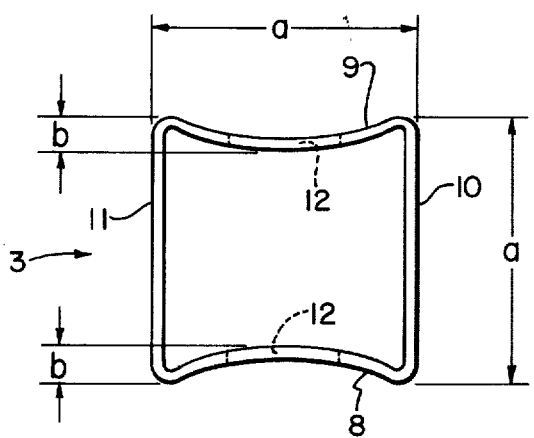
FIG. 2 is a top view of a four-sided tubular structural member employed in the support arrangement of the invention.

Referring now to FIG. 1, there is shown in an exploded perspective view a support arrangement 1 in accordance with the present invention. The support arrangement 1 generally includes a tubular structural member 3, only a portion of which is shown in FIG. 1, a support arm 5 and a locking clip 7. The tubular member 3, a top view of which is shown in FIG. 2, has four sides of which two sides, 8 and 9, are concave and the other two sides, 10 and 11, are flat. The concave sides 8 and 9 of the tubular member 3 have a plurality of equi-spaced rectangular-shaped openings 12 provided longitudinally therein, these openings being defined by edge surfaces 12a – 12d in the concave sides 8 and 9. Although not shown in FIG. 1, openings may also be provided in the flat sides 10 and 11 of the tubular member 3, of any desired configuration, by which several tubular members may be readily secured to each other and also to other structural elements, as by nuts, bolts and connecting fittings, to form a complete support frame for use in applications such as the aforementioned telephone cable vault and telephone manhole installations. The tubular member 3, as employed in the present invention, may be produced from 12-gauge pre-galvanized steel with each side having a typical width, shown at a in FIG. 2, of 1¾ inches. A typical maximum depth of concavity for the concave sides 8 and 9, measured with respect to the inner surfaces thereof and shown at b in FIG. 2, is 7/32 inch. The purpose of the aforementioned concave sides 8 and 9 will become readily apparent hereinafter. The openings 12 in the concave sides 8 and 9 each have a typical width, shown at c in FIG. 1, of ¾ inch and a typical length, shown at d in FIG. 1, of ⅞ inch. The openings 12 are typically spaced from each other by 1½ inches on centers.

Figure 3:
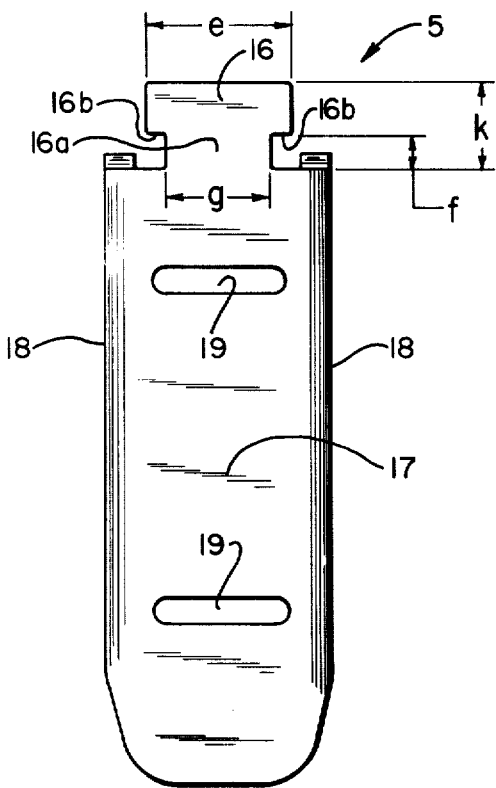
FIGS. 3 and 4 are top and bottom views, respectively, of a support arm employed in the support arrangement of the invention.
Figure 4:
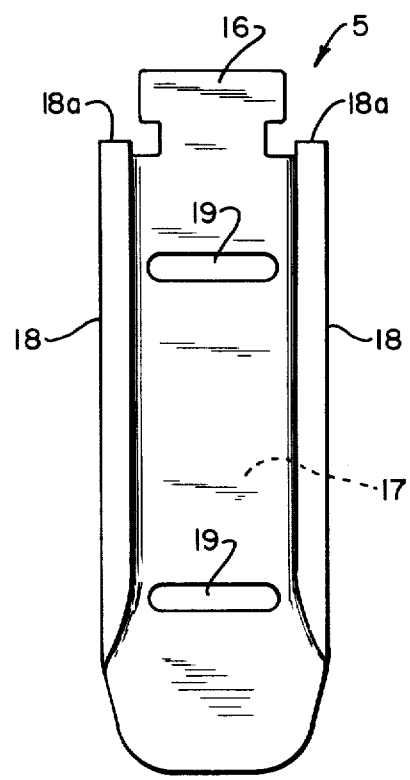

The aforementioned support arm 5, top and bottom views of which are shown in FIGS. 3 and 4, respectively, is of a commercially-available type well known and employed in the telephone utility field and is commonly referred to as a "cable hook". The support arm 3 is of a unitary construction and includes a T-shaped end portion 16 which is caused to be inserted into one of the openings 12 of the tubular member 3, in a manner to be described hereinafter, a generally flat portion 17 integral with the T-shaped end portion 16 and arranged to receive a length of electrical cable transverse to its long dimension, and a pair of tapered side portions 18 integral with the flat portion 17. The support arm 5 also includes a pair of openings 19 by which a length of electrical cable (not shown) may be secured to the support arm 5, for example, by means of conventional clamping elements (also not shown), which are arranged to be inserted into the openings 19 and to overlap the cable. The support arm 5, as described hereinabove and used in the field, is typically fabricated from steel of 3/16 inch thickness. To permit insertion and the subsequent retention of the T-shaped end portion 16 of the support arm 5 in an opening 12 of the tubular member 3, the dimension of the wide section of the T-shaped end portion 16, shown at e in FIG. 3, has a value less than either diagonal of an opening 12 in the tubular member 3 but less than the width c of the opening. Also, the length of the neck section 16a of the T-shaped portion 16, shown at f in FIG. 3, has a value approximately equal to the maximum depth of curvature b of a concave side of the tubular member 3, and the width of the neck section 16, shown at g in FIG. 3, has a value slightly less than the width c of an opening 12 in the tubular member 3.

Figure 5:
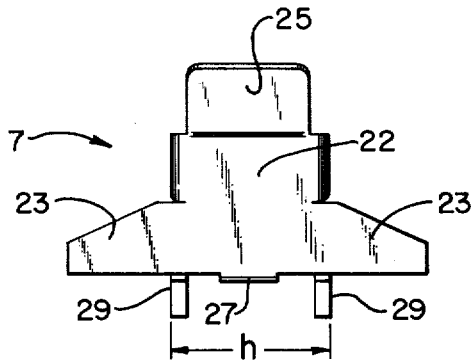
FIGS. 5, 6 and 7 are front, side and rear perspective views, respectively, of a locking clip employed in the support arrangement of the invention.
Figure 6:
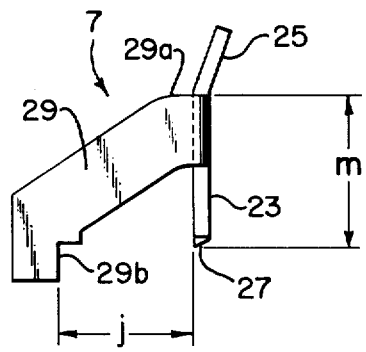
Figure 7:
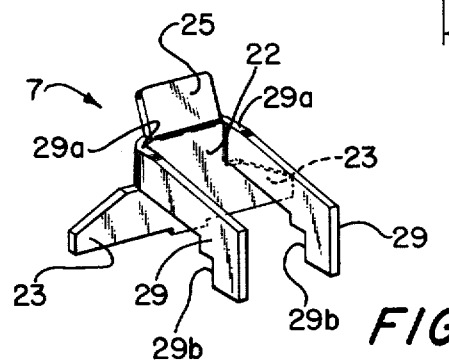

The aforementioned locking clip 7 is employed to lock the support arm 5 to the tubular member 3 and is shown in detail in the front, side and rear perspective views of FIGS. 5, 6 and 7, respectively. As shown in these figures and also in FIG. 1, the locking clip 7 includes a flat main body portion 22, a pair of wing-shaped side portions 23 integral with and in the same plane as the main body portion 22, a first tab portion 25 integral with and at a slight angle (e.g., approximately 10° – 15°) to the plane of the main body portion 22, a second, smaller tapered tab portion 27 integral with and in the same plane as the main body portion 22, and a pair of spaced-apart leg portions 29 integral with and normal to the plane of the flat body portion 22. As further indicated by the figures, particularly FIGS. 6 and 7, each of the leg portions 29 of the locking clip 7 is curved slightly at an upper region 29a thereof and has a notch 29b defined at the free end thereof. The outer surfaces of the leg portions 29 are spaced apart by an amount, shown at h in FIG. 5, which is slightly less than the width c of an opening 12 of the tubular member 3. The distance between the rear surface of the main body portion 22 and the notch in each leg portion 29, shown at j in FIG. 6, is made to be approximately equal to the length of the T-shaped end portion 16 of the support arm 5, shown at k in FIG. 3. The function and purpose of the various portions of the locking clip 7 will be apparent from the following discussion of the manner in which the tubular member 3, the support arm 5 and the locking clip 7 are assembled together to provide the support arrangement 1. A suitable material for the fabrication of the locking clip 7 is 12- gauge steel.

To assemble the aforedescribed tubular member 3, support arm 5 and locking clip 7 to provide the support arrangement 1, the T-shaped end portion 16 of the support arm 5 is first inserted along either diagonal of one of the openings 12 of the tubular member 3, for example, an opening 12 in the concave side 8. The support arm 5 is then turned through an angle (approximately 45°) until the bottom surface of the T-shaped end portion 16, specifically, the bottom surface of the neck section 16a of the T-shaped end portion 16, abuts against the bottom edge surface 12a at the opening 12 in the tubular member 3, and the back edges of the side portions 18 of the support arm 5, as indicated at 18a in FIGS. 1 and 4, abut against the outer surface of the concave side 8. Also, in this position, the front edges of the T-shaped end portion 16, as shown at 16b in FIGS. 1 and 3, abut against the inner surface of the concave side 8 at points adjacent to the opening 12 at the side edge surfaces 12a and 12b of the tubular member 3. The depth of concavity of the side 8, which, as mentioned previously, is approximately equal to the length f (FIG. 3) of the neck section 16a of the support arm 7, insures that the support arm 5 is maintained in a horizontal position and, in addition, enables the support arm 5 to support a greater weight than would be possible if the side 8 were not concave. Further, by virtue of the fact that the width e (FIG. 3) of the T-shaped end portion 16 is greater than the width c of the opening 12 and also that the width g (FIG. 3) of the neck section 16a of the T-shaped end portion 16 is slightly less than the width c of the opening 12, the T-shaped end portion 16 fits snugly within the opening 12 and the support arm 5 is incapable of any significant lateral movement. Any possibility of an upward or turning movement of the support arm 5 is prevented by the use of the locking clip 7.

The locking clip 7 is inserted into the opening 12 which, following the insertion therein of the T-shaped end portion 16 of the support arm 5, is reduced in size. The leg portions 29 of the locking clip 7, the spacing h of the outer surfaces of which is less than the width c of the opening 12, as previously stated, are first inserted into the reduced opening 12 and force is applied against the main body portion 22, as by a thumb or by a tool such as a hammer or screw driver. This force causes the leg portions 29 and the lower tab portion 27 of the locking clip 7 to slide along the top surface of the support arm 5. The force is applied until the leg portions 29 move beyond the end of the T-shaped end portion 16 and the notches in the free ends of these leg portions engage the rear edge of the T-shaped end portion 16, as shown, for example, in FIG. 9. When this engagement occurs, the top surfaces of the leg portions 29 in the vicinity of the flat portion 22 abut against the upper edge surface 12c at the opening 12 in the tubular member 3, and the inner surfaces of the wing-shaped side portions 23 abut against the outer surface of the concave side 8 at the corners thereof thereby limiting the depth of insertion of the locking clip 7 into the opening 12.

Figure 8:
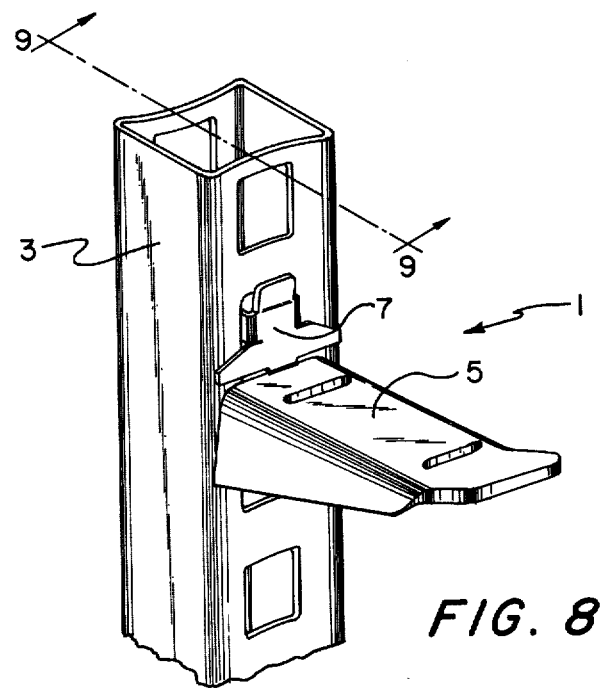
FIG. 8 is a perspective view of the support arrangement of the invention in its fully assembled state.
Figure 9:
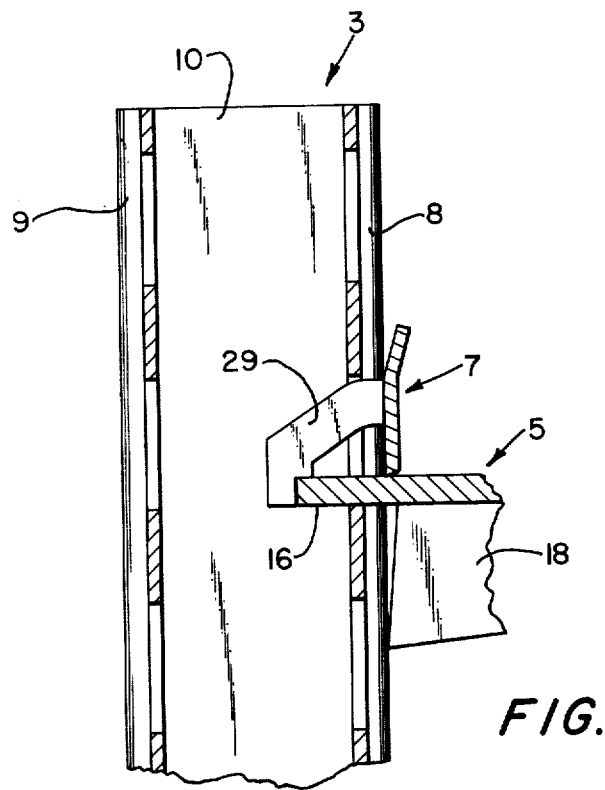
FIG. 9 is a cross-sectional view of the support arrangement of the invention taken along the line 9—9 in FIG. 8.

The completely assembled support arrangement 1 resulting from the aforedescribed assembly operations is shown in FIG. 8. FIG. 9 illustrates, as previously indicated, the manner in which the notches in the free ends of the leg portions 29 engage the rear edge of the T-shaped end portion 16 of the support arm 7. To insure that the locking clip 7 fits tightly within the reduced opening 12, the distance between the top surfaces of the leg portions 29 and the bottom of the lower tab portion 27 of the locking clip 7, as shown at m in FIG. 6, is made to be slightly greater than the height of the reduced opening 12. Thus, the force applied against the locking clip 7 must be sufficient to overcome this slight difference in the dimensions and, in particular, to overcome the slight curvature at the upper regions 29a of the leg portions 29.

When the locking clip 7 is completely in position, as indicated in FIGS. 8 and 9, the support arm 5 is prevented from any significant upward movement by virtue of the abutting of the top surfaces of the leg portions 29 against the upper edge surface 12c of the tubular member 3 and the engagement of the notches of the free ends of the leg portions 29 with the rear edge of the T-shaped end portion 16 of the support arm 5.

To remove the locking clip 7 from the opening 12, for example, to disassemble the support arrangement 1, all that is necessary is that a tool, such as a screw driver or the claw end of a hammer, be inserted behind the upper tab portion 25 of the locking clip 7 and force be applied between the upper tab portion 25 and the concave side 8. It is to be noted that the insertion of the tool is facilitated by the fact that the upper tab portion 25 of the spring clip 7 is inclined away from the outer surface of the concave side 8 by a slight amount and further by the fact the side 8 itself is concave. The applied force causes the tapered lower tab portion 27 to pivot on the upper surface of the support arm 5 and the free ends of the leg portions 29 to move upwardly and to become disengaged from the rear edge of the T-shaped end portion 16 of the support arm 5. Once the disengagement of the leg portions 29 takes place, the further removal of the locking clip 7 may be readily accomplished by hand.

MODIFICATIONS

While a particular support arrangement 1 has been described hereinabove, it will be apparent that many modifications and changes may be made therein. For example, the support arm 3 may be designed to have dimensions, particularly dimensions of the T-shaped end portion 16, differing from those described herein which would obviate the need for the sides 8 and 9 of the tubular member 3 to be concave. In addition, a support arm of a type different from that ("cable hook") described hereinabove and used for a purpose other than cable support may be used with the tubular member 3 provided the support arm has a T-shaped portion. Further, if a permanent assembly of the support arrangement 1 is desired, that is, removal of the locking clip 7 is not generally contemplated, the tab portions 25 and 27 of the locking clip 7 may be eliminated. In some applications, only a single leg portion 29, centrally located on the main body portion 22, may be adequate. Other modifications and changes will be obvious to these skilled in the art without departing from the invention as called for in the appended claims.

What is claimed is:

1. A support arrangement comprising:

a structural member including a side having a rectangular opening therein defined by top, bottom and side edge surfaces in the side, said side having a front surface and a rear surface and the rectangular opening in said side having a predetermined height and width;

a support member having a T-shaped end portion disposed in the rectangular opening in the side and a support portion adjoining the T-shaped end portion, said T-shaped end portion having a bottom surface abutting the bottom edge surface in the side of the structural member, front edges abutting the inner surface of the side of the structural member adjacent to the rectangular opening, a top surface, and a rear edge, said T-shaped end portion further having a maximum width less than either diagonal of the rectangular opening but greater than the width of the rectangular opening, and having a minimum width slightly less than the width of the rectangular opening whereby the T-shaped end portion is incapable of any significant lateral movement within the opening; and a locking clip disposed in the rectangular opening and adjacent to the top surface of the T-shaped end portion of the support member, said locking clip having a main body portion; a leg portion adjoining the main body portion and having an upper surface and a free, notched end; and side portions adjoining the main body portion, the main body portion of the locking clip being disposed adjacent to the rectangular opening above the top surface of the T-shaped end portion of the support member and external to the outer surface of the side of the structural member, said leg portion of the locking clip extending into the opening with the free, notched end thereof engaging the rear edge of the T-shaped end portion and the top surface thereof abutting the top edge surface of the side at a predetermined region, thereby preventing any significant upward movement of the support member within the rectangular opening, and the side portions of the locking clip abutting the outer surface of the side of the structural member.

2. A support arrangement in accordance with claim 1 wherein:

the locking clip further has a first tab portion adjoining the main body portion and inclined away from the outer surface of the side above the rectangular opening, thereby to establish a space between the first tab portion and the outer surface of the side to permit the insertion in the space of a mechanism for removing the locking clip from the rectangular opening in the side.

3. A support arrangement in accordance with claim 2 wherein:

the support portion of the support member has a top surface; and the locking clip further has a second tab portion adjoining the main body portion and in contact with the top surface of the support portion of the support member adjacent to the T-shaped end portion of the support member, said second tab portion having a tapered bottom surface for facilitating the removal of the locking clip from the rectangular opening in the side.

4. A support arrangement in accordance with claim 1 wherein:

the side of the structural member is concave; and the T-shaped end portion has a first, wide section and a second, narrow neck section, the length of the neck section being approximately equal to the maximum depth of concavity of the concave side, as measured with respect to the inner surface of the concave side.

5. A support arrangement in accordance with claim 4 wherein:

the support member further has side portions adjoining the support portion and having rear edges abutting the outer surface of the concave side of the structural member.

6. A support arrangement comprising:

a tubular structural member having four sides, two opposite sides of the said four sides being flat and the other opposite sides being concave, each of the concave sides having an inner surface and an outer surface and further having a plurality of spaced rectangular openings therein, each of said rectangular openings being defined by top, bottom and side edge surfaces in the tubular structural member and each opening having a predetermined height and width;

a support member having a T-shaped end portion disposed in one of the rectangular openings in one of the concave sides of the tubular structural member and a support portion adjoining the T-shaped end portion, said T-shaped end portion having a bottom surface abutting the bottom edge surface of the tubular member at the associated rectangular opening and including a first, wide section and a second, narrow neck section extending normally from the first section, the first section of the T-shaped end portion having front edges adjacent to the neck section and abutting the inner surface of the concave side adjacent to the rectangular opening and also having a rear edge, the first section of the T-shaped end portion further having a width less than either diagonal of the rectangular opening but greater than the width of the opening, and the neck section of the T-shaped end portion having a width slightly less than the width of the opening whereby the T-shaped end portion is incapable of any significant lateral movement within the opening, the neck section further having a length approximately equal to the maximum depth of concavity of the concave side as measured with respect to the inner surface of the concave side; and a locking clip disposed in the rectangular opening and adjacent to the T-shaped end portion of the support member, said locking clip having a main body portion; a pair of leg portions adjoining the main body portion and each having an upper surface and a free, notched end; and side portions adjoining the main body portion; the main body portion of the locking clip being disposed adjacent to the rectangular opening above the T-shaped end portion of the support member and external of the outer surface of the concave side of the structural member, said leg portions of the locking clip both extending into the opening with the free, notched ends thereof both engaging the rear edge of the T-shaped end portion and the top surfaces thereof abutting the top edge surface of the concave side at the opening at predetermined regions thereof, thereby preventing any significant upward movement of the support member within the rectangular opening, and the side portions of the locking clip abutting the outer surface of the concave side.

7. A support arrangement in accordance with claim 6 wherein:

the leg portions of the locking clip extend normally from the main body portion of the locking clip and each have an outer surface, the distance between the outer surfaces of the leg portions being slightly less than the width of the rectangular opening.

8. A support arrangement in accordance with claim 7 wherein:

the locking clip further has a first tab portion adjoining the main body portion and inclined away from the outer surface of the concave side above the rectangular opening, thereby to establish a space between the first tab portion and the outer surface of the concave side to permit the insertion in the space of a mechanism for removing the locking clip from the rectangular opening.

9. A support arrangement in accordance with claim 8, wherein:

the support portion of the support member has a top surface; and the locking clip further has a second tab portion adjoining the main body portion and in contact with the top surface of the support portion of the support member adjacent to the T-shaped end portion of the support member, said second tab portion having a tapered bottom surface for facilitating the removal of the locking clip from the rectangular opening.

10. A support arrangement in accordance with claim 9 wherein:

the support member further has side portions adjoining the support portion and having rear edges abutting the outer surface of the concave side below the rectangular opening.

11. A support arrangement in accordance with claim 10 wherein:

the main body portion, side portions and the first and second tab portions of the locking clip are all flat and the main body portion, side portions and the second tab portion of the locking clip are all in the same plane.

* * * * *